United States Patent [19]
Robin

[11] 3,721,947

[45] March 20, 1973

[54] BATTERY TERMINAL GUARD

[76] Inventor: Edward L. Robin, 115 Glacier Circle, Vacaville, Calif. 95688

[22] Filed: July 13, 1972

[21] Appl. No.: 271,632

[52] U.S. Cl. ............................................. 339/116 R
[51] Int. Cl. .............................................. H01r 11/26
[58] Field of Search....339/36, 63, 94, 116, 117, 118; 136/182, 163; 220/24, 60

[56] References Cited

UNITED STATES PATENTS

| | | | |
|---|---|---|---|
| 3,413,593 | 11/1968 | Schaefer | 339/116 C |
| 2,061,190 | 11/1936 | Ericson | 339/63 R |
| 3,641,480 | 2/1972 | Robin | 339/116 R |
| 1,722,203 | 7/1929 | Day | 136/163 X |
| 2,800,310 | 7/1957 | Snyder | 220/24 R X |

Primary Examiner—Richard E. Moore
Attorney—Roger W. Erickson

[57] ABSTRACT

A protective device for preventing the corrosion or sulfation of a cable connector on the battery terminal includes a flexible casing that fits snugly around the connector and the base of the terminal and an upper opening forming the seat for a rigid, circular top cover element that gives the casing an air tight seal when installed in the casing.

5 Claims, 6 Drawing Figures

PATENTED MAR 20 1973 3,721,947
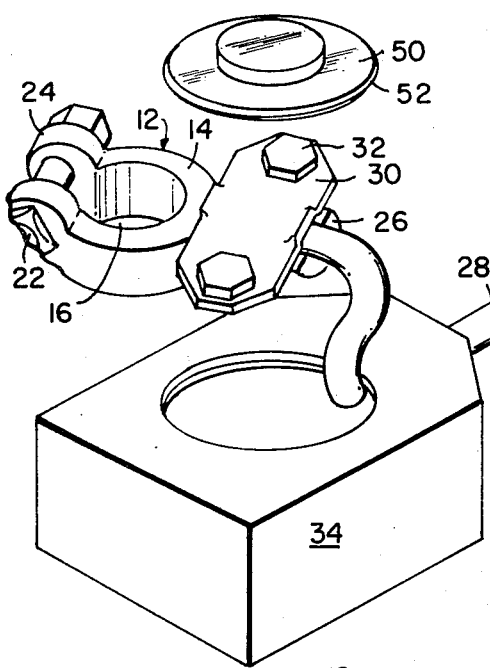
FIG_1
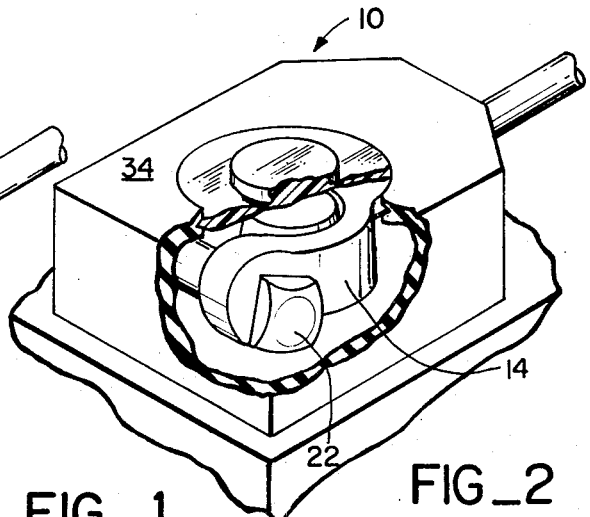
FIG_2
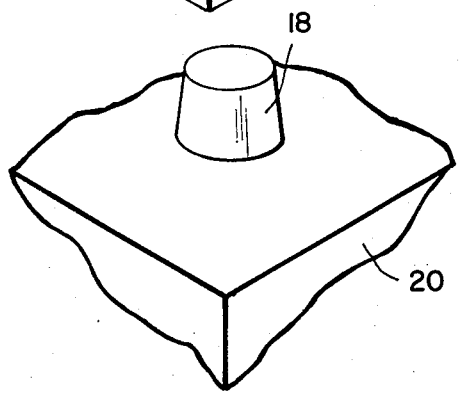
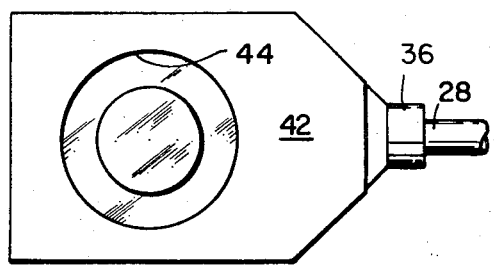
FIG_3
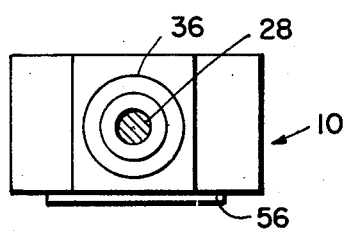
FIG_5
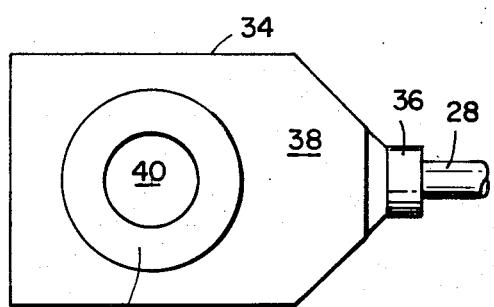
FIG_4
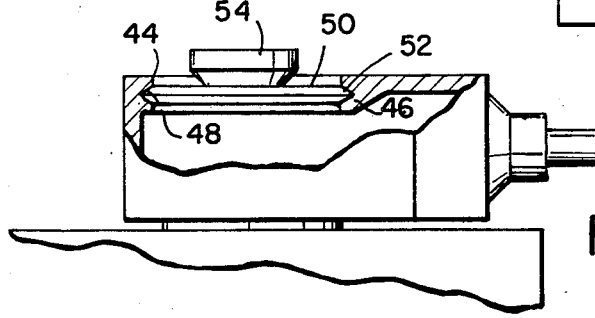
FIG_6

BATTERY TERMINAL GUARD

BACKGROUND OF THE INVENTION

This invention relates to corrosion protective or preventing devices for electrical connections.

Wet cell batteries such as the conventional lead sulphate type batteries used in automobiles, boats and other vehicles have long presented a serious problem of corrosion or sulphation at the terminals. Generally, the problem arises due to the constant evaporation of the battery electrolyte through its air vents. When this vapor contacts metal parts as on the battery terminal and its attached connector, a white powdery corrosion is formed. Ultimately, this corrosion can seriously damage the battery terminals and connectors which will cause malfunction that can shorten the battery life, destroy its effectiveness or even create hazards to safe vehicle operation. In my U.S. Pat. No. 3,641,480 I disclosed a battery terminal guard comprising a casing that fit around the terminal and a top cover having a grease fitting which enabled grease or some suitable anti-corrosion material to be forced inside the housing. The grease was necessary because the top cover did not provide an air-tight closure, but it had certain disadvantages. In general, the unavailability of a proper anti-corrosion material, the inconvenience of handling it and the fact that it made the terminal messy and difficult to handle, all contributed to the need to improve my prior device.

A general object of the present invention is to provide a solution to the problem of battery terminal-connector corrosion that eliminates the necessity to use a non-corrosive material around the terminal.

More specifically, an object of the present invention is to provide a device that will surround the cable connector when it is on the battery terminal; that will provide essentially an air-tight seal around the base of the terminal post and yet will enable the device to be easily installed on the end of a battery cable and connector, and subsequently on the battery terminal.

Another object of the present invention is to provide a protective device for cable connectors on battery terminals that can be readily adapted to various forms or shapes of cable connectors and that is particularly well adapted for ease and economy of manufacture.

SUMMARY OF THE INVENTION

In my invention, the aforesaid objects are accomplished by a guard or sealing element in the forming of a casing that is made of some suitable flexible and non-conductive material and shaped to fit around the cable connector. A bottom wall in this sealing element fits snugly around the base of the battery terminal post and the upper side of the element has a removable cover. The latter cover is provided with a tapered edge so that when the protective device is installed this edge fits within a complementary groove in the top wall of the casing and essentially forms an air-tight closure. Thus, the device surrounds the cable connector, keeps air out and provides an effective corrosion barrier.

Other objects, advantages and features of the invention will become apparent from the following detailed description of one embodiment thereof presented with the accompany drawings.

BRIEF DESCRIPTION OF THE DRAWINGS

In the drawings:

FIG. 1 is an exploded view in perspective showing a protective device embodying the principles of my invention;

FIG. 2 is a fragmentary view in perspective showing the device of FIG. 1 assembled around the cable connector and installed on the battery terminal with portions of the device broken away;

FIG. 3 is a top plan view of a protective device according to my invention;

FIG. 4 is a bottom view of the device in FIG. 3;

FIG. 5 is an end view of the device in FIG. 3; and

FIG. 6 is a side view of the device of FIG. 3 with portions broken away in section.

DETAILED DESCRIPTION OF ONE EMBODIMENT

Referring to the drawings, FIG. 1 shows a protective device 10 embodying the principles of my invention as it appears during its installation on a conventional connector attached to the end of a battery cable. The connector 12 shown is the well known two bolt solderless split-block form of replacement connector having a pair of jaws 14 forming an opening 16 that fits around a standard terminal 18 of a wet cell battery 20. A machine bolt 22 extends through the ends of the jaws and a nut 24 on this bolt is tightened to draw the jaws together when they are on a terminal. At its other end the jaws join together at a neck portion 26 forming a flange that bears against one side of a cable 28. A plate 30 having a similar shape to flange fits against the other side of the cable and is held tightly to the flange by a pair of bolts 32 on opposite sides of the cable.

The protective device 10 comprises a hollow casing 34 which may be made of a flexible, non-conductive and non-corrosive material such as a suitable rubber-like or plastic material using conventional molding techniques. Preferably a synthetic rubber material is used which is impervious to attack by sulphate compounds. As shown in FIGS. 3 – 6, this casing is formed with a shape generally similar to the cable connector 12 so that it will fit around without any large air spaces. Thus, the casing 34 is substantially oblong and is tapered at one end through which the cable enters. For other types of connectors used on battery cables, the casing may have a different shape but for the connector 12 the casing 34 is particularly well adapted to provide good protective results. The main function of the casing is that it may be easily attached to the connector 12 on the cable 28 and fit snugly around it when installed. Extending from an end wall at the tapered end of the casing is a tubular sleeve portion 36 that will fit tightly around and form a seal with the battery cable adjacent the attached connector. On a bottom wall 38 of the casing is a circular opening 40 that is dimensioned to fit tightly around the base of the battery terminal 18 which normally has a slight taper. An upper wall 42 of the casing has a somewhat larger opening 44 which is circular in shape and big enough to enable the casing to be easily installed on the connector. Around the edge of this opening 44 the upper wall has a circular portion 46 of increased thickness with an annular groove 48 for holding a cover member 50. This cover is also circular in shape and is preferably made of a rigid, clear plastic material. Its peripheral edge 52 has a contour which, in cross-section, matches the groove 48 of the opening 44. Thus, in the embodiment shown, the groove 48 is essentially V-shaped in cross-section while the peripheral edge 52 has a wedge-shaped cross-section of the same size. The diameter of the cover is such that its wedge-shaped edge fits tightly within the groove 48 when the cover is in place. Fixed to the top of the cover member is a projecting portion 54 that provides a handle means for gripping it firmly. This handle means may be of the same material as the cover itself and is preferably circular in shape.

When my protective device 10 is installed the flexible casing 34 is first placed on the battery cable 28 so that it surrounds and conforms to the connector 12 and the sleeve portion 36 fits around the cable. This is accomplished by forcing the connector through the opening 44. The connector and attached casing are now placed over the battery terminal 18 and the connector jaws 14 can be tightened, if necessary. Now, the circular cover member 50 is placed within the casing 34 so that it covers the connector and the battery terminal. As shown in FIG. 6, the bottom casing wall 38 forms a protective barrier between the connector and the battery and the opening 40 fits around the terminal so that even corrosive vapor cannot easily pass through it. Around the opening 40 on the bottom casing wall 38 is an annular raised portion 56 that serves to keep most of the bottom wall from contacting the battery surface. With the cover member 50 properly in place the device 10 is fully sealed around the battery terminal, the connector cable and at the top of the casing around the cover member 50, thereby forming an air-tight enclosure that prevents corrosive elements from attacking the connector and terminal.

If cover member 50 is made of a transparent plastic material a visual check can be periodically made to determine if any corrosion has taken place. It should, therefore, be apparent that my invention provides a unique and effective solution to the problem of battery sulphation or corrosion without the need to use grease or other anti-corrosive materials. In addition to prolonging battery life, it increases automobile safety by insulating battery terminals from accidental contacts with metal objects and by reducing automotive fire hazards heretofore caused by faulty battery connectors.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A protective device for a battery cable connector on a battery cable and adapted to connect with a terminal post of a wet cell battery, comprising:
   a hollow casing of flexible material including integral portions forming sidewalls and a bottom wall attached thereto, said bottom wall having an opening of a shape and dimensioned to closely fit a base of the battery terminal, a sleeve member extending from one sidewall adapted to fit tightly around the battery cable and an upper wall means having a circular opening larger than said bottom wall opening with a groove around the pierpheral edge of said opening; and a relatively rigid disk-like cover member retained by said upper wall means having a peripheral edge portion shaped to fit within said groove to form a substantially air-tight closure, portions of the material of said casing which form said groove being positioned to be deformed upon insertion and/or removal of said cover member.

2. The device as described in claim 1 wherein said cover member is a rigid, clear plastic material and includes an upwardly projecting portion forming a handle.

3. The device as described in claim 1 wherein said casing has a generally oblong shape with a tapered end portion particularly adapted to fit snugly around a two bolt solderless split-block type cable connector.

4. The device as described in claim 1 wherein said casing is formed as one integral body from a synthetic rubber material.

5. The device as described in claim 1 wherein said groove has a V-shaped cross-section and said peripheral edge portion of said cover has a matching wedge-shaped cross-section.

* * * * *